(12) United States Patent
Kwon

(10) Patent No.: US 7,644,132 B2
(45) Date of Patent: Jan. 5, 2010

(54) HOME TELEMATICS SYSTEM PROVIDING SYNCHRONIZATION SERVICE BETWEEN TELEMATICS TERMINAL AND COMPUTER AND METHOD THEREOF

(75) Inventor: Oh Il Kwon, Icheon-shi (KR)

(73) Assignee: Hyundai Autonet Co., Ltd., Icheon-shi Kyunki-do (KR)

( * ) Notice: Subject to any disclaimer, the term of this patent is extended or adjusted under 35 U.S.C. 154(b) by 581 days.

(21) Appl. No.: 11/428,320

(22) Filed: Jun. 30, 2006

(65) Prior Publication Data
US 2007/0022177 A1    Jan. 25, 2007

(30) Foreign Application Priority Data
Jul. 20, 2005    (KR) ...................... 10-2005-0065546

(51) Int. Cl.
*G06F 15/16* (2006.01)
(52) U.S. Cl. .................. 709/217; 709/203; 709/227; 713/161; 713/168
(58) Field of Classification Search ......... 709/202–203, 709/217–219, 227–228; 713/161, 168–170
See application file for complete search history.

(56) References Cited

U.S. PATENT DOCUMENTS

| | | | | |
|---|---|---|---|---|
| 6,912,581 B2* | 6/2005 | Johnson et al. | ............. | 709/217 |
| 7,020,545 B2* | 3/2006 | Kamdar et al. | ............. | 455/574 |
| 7,366,892 B2* | 4/2008 | Spaur et al. | ................. | 713/151 |
| 7,389,319 B2* | 6/2008 | Barr et al. | .................... | 709/203 |
| 7,490,125 B1* | 2/2009 | Jagadeesan et al. | ......... | 709/203 |
| 2003/0182360 A1* | 9/2003 | Mocek et al. | ............... | 709/203 |

FOREIGN PATENT DOCUMENTS

| | | |
|---|---|---|
| KR | 1020030007195 | 1/2003 |
| KR | 1020030012520 | 2/2003 |
| KR | 1020030016739 | 3/2003 |
| KR | 1020030062735 | 7/2003 |
| KR | 1020040010935 | 2/2004 |
| KR | 1020040010937 | 2/2004 |
| KR | 1020040035236 | 4/2004 |
| KR | 1020040050546 | 6/2004 |

* cited by examiner

*Primary Examiner*—Bharat N Barot
(74) *Attorney, Agent, or Firm*—IPLA P.A.; James E. Bame

(57) ABSTRACT

A home telematics system providing a synchronization service between a telematics terminal and a computer, and a method thereof are provided. The system includes a telematics system having a telematics center; a home network system having a home network center and a home server; the telematics terminal for, upon generation of a synchronization service request, connecting with the home network center through the telematics center, transmitting a synchronization data request message to the home network center, and displaying synchronization data received in response to the synchronization data request message; and the computer for receiving the synchronization data request message through the home network center and the home server, and transmitting the synchronization data stored in a previously allocated storing region to the telematics terminal.

4 Claims, 9 Drawing Sheets

HOME TELEMATICS SYSTEM PROVIDING SYNCHRONIZATION SERVICE BETWEEN TELEMATICS TERMINAL AND COMPUTER AND METHOD THEREOF

BACKGROUND OF THE INVENTION

1. Field of the Invention

The present invention relates to a home telematics system, and more particularly, to a home telematics system providing a synchronization service between a telematics terminal and a computer, and a method thereof, in which data stored in a personal computer can be used in the telematics terminal through the home telematics system.

2. Description of the Related Art

In recent years, a telematics system is one of technologies attracting attention. The telematics system detects occurrence of vehicle accident or theft, guides a vehicle running path, and provides a vehicle driver with a variety of other information using a mobile communication method and a position tracing method associated with Internet. In other words, the telematics system provides information through a vehicle based on a Global Positioning System (GPS) using a mobile communication system and a GPS satellite. Accordingly, the telematics system provides a variety of mobile communication services, such as traffic information, countermeasure to an emergency situation, remote vehicle diagnosis, use of Internet (for example, financial transaction, provision of news, and transmission and reception of e-mail), using the GPS, a wireless communication network and an Internet network.

Further, in the telematics system, various technologies associated with conventional various systems are being proposed and promoted. One of them is a home telematics system associating with a telematics system and a home network system. In general, the home network system is capable of remotely checking or controlling states of an illuminator, a gas valve, a door, and a heater/air conditioner within a home, using a mobile communication network.

In order to invigorate the home telematics system providing various services in association with the telematics system and the home network system, various contents are required for development.

SUMMARY OF THE INVENTION

Accordingly, the present invention is directed to a home telematics system providing a synchronization service between a telematics terminal and a computer, and a method thereof, that substantially overcome one or more of the limitations and disadvantages of the conventional art.

One object of the present invention is to provide a home telematics system providing a synchronization service between a telematics terminal and a computer, and a method thereof, in which data stored in a personal computer can be used in the telematics terminal through the home telematics system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a home telematics system providing a synchronization service between a telematics terminal and a computer, the system including: a telematics system having a telematics center; a home network system having a home network center and a home server; the telematics terminal for, upon generation of a synchronization service request, connecting with the home network center through the telematics center, transmitting a synchronization data request message to the home network center, and displaying synchronization data received in response to the synchronization data request message; and the computer for receiving the synchronization data request message through the home network center and the home server, and transmitting the synchronization data stored in a previously allocated storing region to the telematics terminal through the home server and the home network center.

In another aspect of the present invention, there is provided a home telematics system providing a synchronization service between a telematics terminal and a computer, the system including: a telematics system having a telematics center; a home network system having a home network center and a home server; the telematics terminal for, upon generation of a synchronization service request, connecting with the home network center through the telematics center, transmitting a search request message having a synchronization item and a key word to the home network center, and displaying synchronization data received in response to the search request message; and the computer for receiving the search request message through the home network center and the home server, detecting the synchronization item and the key word from the search request message, searching a previously allocated synchronization item storing region for the synchronization data having the key word, and transmitting the synchronization data to the telematics terminal through the home server and the home network center.

In a further another aspect of the present invention, there is provided a method of a synchronization service between a telematics terminal and a computer in a home telematics system having a telematics system and a home network system, the telematics system having the telematics terminal and a telematics center, and the home network system having a home network center and a home server, the method including the steps of: in the telematics terminal, upon generation of a synchronization service request, connecting with the home network center through the telematics center, transmitting a synchronization data request message to the home network center; in the computer, receiving the synchronization data request message through the home network center and the home server, and transmitting the synchronization data stored in a previously allocated storing region to the telematics terminal through the home server and the home network center; and in the telematics terminal, receiving and displaying the synchronization data.

In a still further another aspect of the present invention, there is provided a method of a synchronization service between a telematics terminal and a computer in a home telematics system having a telematics system and a home network system, the telematics system having the telematics terminal and a telematics center, and the home network system having a home network center and a home server, the method including the steps of: in the telematics terminal, upon generation of a synchronization service request, connecting with the home network center through the telematics center, and transmitting a search request message having a synchronization item and a key word to the home network center; in the computer, receiving the search request message through the home network center and the home server, detecting the synchronization item and the key word from the search request message, searching a previously allocated synchronization item storing region for the synchronization data having the key word, and transmitting the synchronization data to the telematics terminal through the home server and the home network center; and in the telematics terminal, receiving and displaying the synchronization data.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
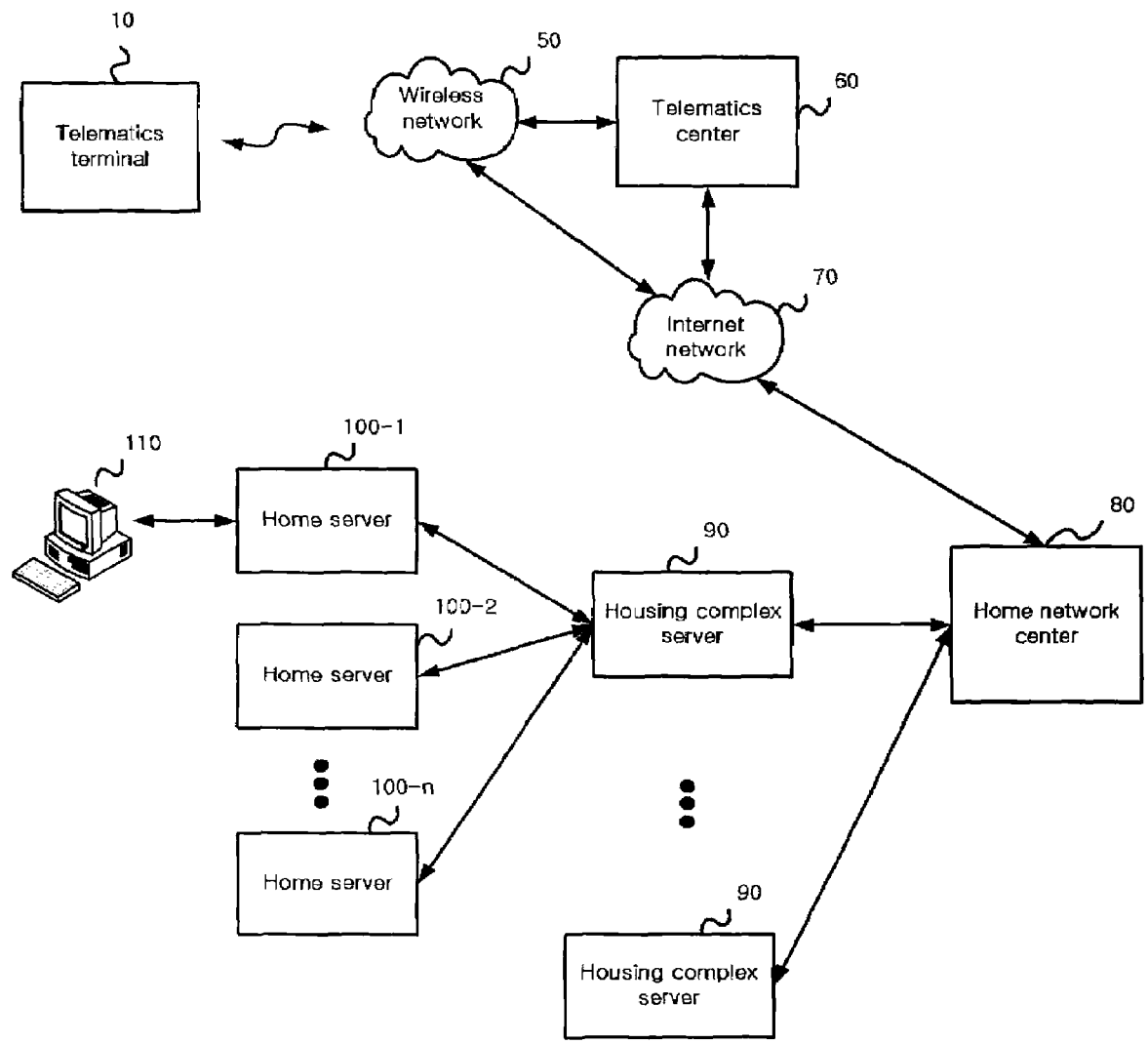
FIG. 1 illustrates a construction of a home telematics system according to the present invention.

Reference will now be made in detail to the preferred embodiments of the present invention, examples of which are illustrated in the accompanying drawings. Wherever possible, the same reference numerals will be used throughout the drawings to refer to the same or like parts.

FIG. 1 illustrates a construction of a home telematics system according to the present invention. The inventive home telematics system will be described in construction and operation with reference to FIG. 1 below.

The home telematics system includes a telematics system and a home network system. The telematics system includes a telematics terminal 10, a wireless network 50, a telematics center 60, and an Internet network 70. The home network system includes the wireless network 50, the Internet network 70, a home network center 80, a housing complex server 90, a home server 100, and home terminal devices. The terminal device can be controlled or can perform a data communication under the control of the home server 100. The terminal device can be a gas valve on/off device, a door lock device, an illuminator, an air conditioner/heater, a videophone, and a computer.

The inventive home telematics system includes the telematics terminal 10, the wireless network 50, the telematics center 60, the Internet network 70, the home network center 80, the housing complex server 90, the home server 100, and the computer 110 being the home terminal device.

The telematics terminal 10 receives various telematics services such as an emergency rescue service, an e-mail service, a news and weather service. Further, the telematics terminal 10 has information on its own home server 100-1, for example, Internet protocol (IP) information. Upon request for a home telematics service, the telematics terminal 10 connects to the home network center 80 through the wireless network 50 and the Internet network 70, and controls the home terminal devices or performs the data communication with the computer 110 through the corresponding housing complex server 90 and the corresponding home server 100, via the home network center 80.

The telematics center 60 provides the various telematics services to a plurality of the telematics terminals 10, and manages authentication and billing for the services. Further, upon generation of a request for controlling the home terminal devices or performing the data communication from the predetermined telematics terminal 10, the telematics center 60 requests the home network center 80 for the authentication in order to control the home terminal devices or perform the data communication and, upon authentication success, connects the home network center 80 with the corresponding telematics terminal 10.

The home network center 80 manages authentication and access information on a plurality of the housing complex servers 90 and the home servers 100, performs the authentication according to a telematics center's request for authentication on the predetermined telematics terminal 10 and, upon the authentication success, connects with the corresponding home server 100.

The home server 100 has synchronization object information on the home terminal devices, that is, information on the computer, the illuminator, and the air conditioner/heater. The home server 100 determines whether or not a reception signal is for any terminal device, and controls the corresponding terminal device or transmits data to the corresponding terminal device. Further, the home server 100 collects and transmits state information on the terminal devices to the telematics terminal 10.

The computer 110 has a control program for synchronizing data with the telematics terminal 10. The computer 110 stores data on a restaurant, a historic site, a tourist destination, and an address book (Hereinafter, referred to as "synchronization data") in a previously allocated storage region, and shares the synchronization data with the telematics terminal 10 through the corresponding home server 100, the housing complex server 90, the home network center 80, the Internet network 70, and the wireless network 50, only for the allocated storage region (Hereinafter, referred to as "synchronization data allocation storage region"). The computer 110 can be a personal computer (PC), a notebook, or a personal digital assistant (PDA).

Figure 2:
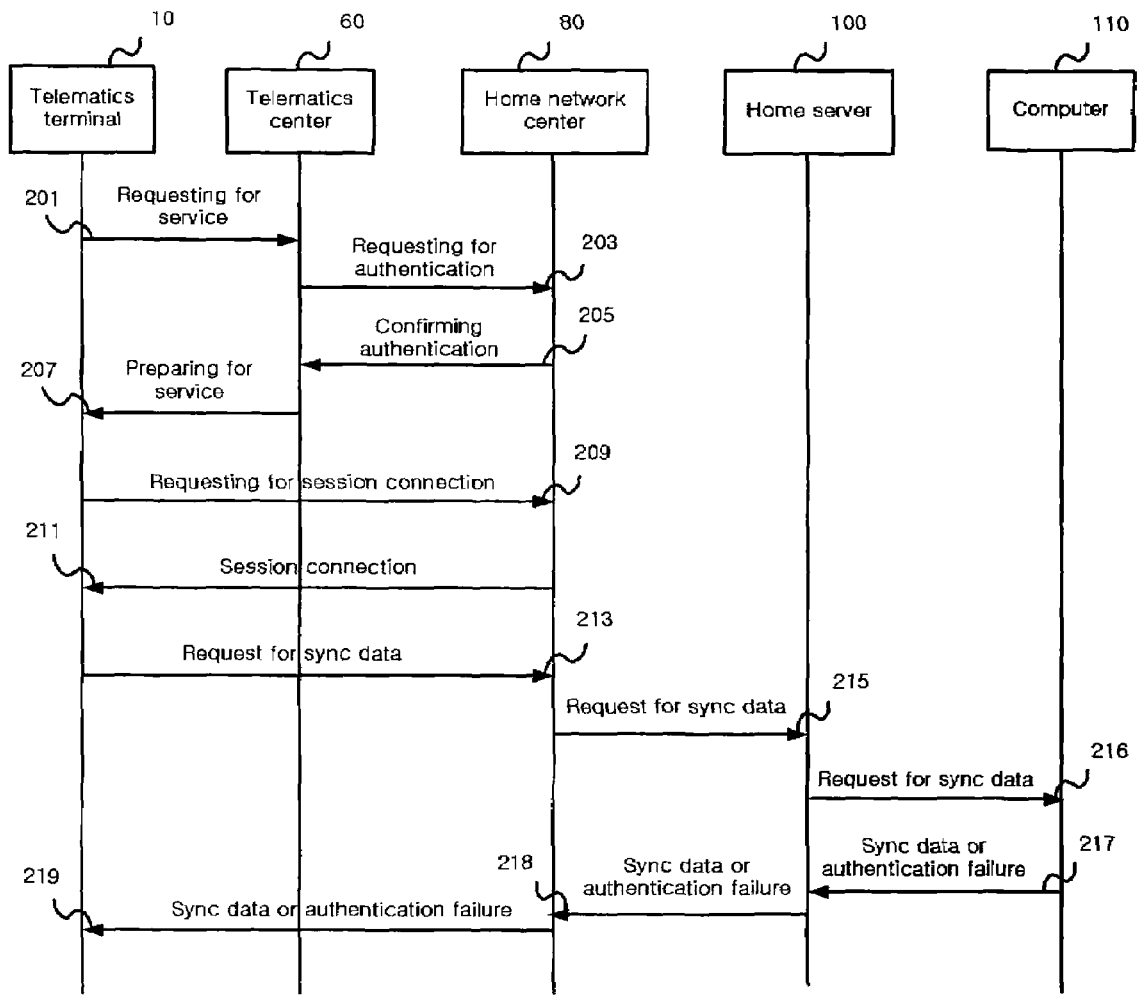
FIG. 2 is a process diagram illustrating a method of a synchronization service between a telematics terminal and a personal computer according to the first embodiment of the present invention.

FIG. 2 is a process diagram illustrating a method of a synchronization service between the telematics terminal and the personal computer according to the first embodiment of the present invention. Hereinafter, the inventive method of the synchronization service will be described with reference to FIGS. 1 and 2.

Upon generation of a home telematics service request from a user, in Step 201, the telematics terminal 10 transmits a service request message including self identification and authentication information, destination (home server 100-1) information, and message kind information, to the telematics center 60. The authentication information includes first authentication information on the telematics center 60, second authentication information on the home network center 80, and third authentication information for performing the authentication in the computer 110 being the terminal device.

Upon receipt of the service request message from the telematics terminal 10, in Step 203, the telematics center 60 transmits an authentication request message of requesting the authentication on the telematics terminal 60, to the home network center 80. The authentication request message includes telematics terminal 10 information, destination information, and authentication information on the telematics terminal 10.

Upon receipt of the authentication request message, the home network center 80 detects the destination information and the authentication information from the received authentication request message, compares the detected authentication information with previously stored authentication information on a destination, performs the authentication, and transmits an authentication confirmation message including authentication result information to the telematics center 60 in Step 205.

If so, the telematics center 60 analyzes the authentication confirmation message and, upon authentication success, in Step 207, transmits a service preparation message of informing that preparation for service is completed to the telematics terminal In Step 209, the telematics terminal 10 receives the service preparation message, and transmits a session connection request message of requesting a session connection, which sets, maintains, and synchronizes mutual communication between communication systems, to the home network center 80 through the wireless network 50 or through the wireless network 50 and the telematics center 60.

In Step 211, the home network center 80 receives the session connection request message, and transmits a session connection message of permitting the session connection with the corresponding home server 100-1, to the telematics terminal 10.

Upon receipt of the session connection message from the home network center 80, in Step 213, the telematics terminal 10 transmits a synchronization data request message including self identification and authentication information, destination (home server 100-1) information, and message kind information, to the home network center 80. The authentication information is the third authentication information for performing the authentication in the computer 110.

In Step 215, the home network center 80 transmits the synchronization data request message to the corresponding home server 100-1 and, in Step 216, the home server 100-1 transmits the received data request message to the computer 110.

Upon receipt of the synchronization data request message from the home server 100-1, the computer 110 detects and compares the third authentication information with previously stored authentication information, performs the authentication, and transmits a synchronization message to the home server 100-1 according to a home network protocol in Step 217. Upon the authentication success, the synchronization message includes synchronization data and, upon the authentication failure, the synchronization message includes authentication failure data for informing the authentication failure.

The home server 100-1 receives the synchronization message, transmits the received synchronization message to the home network center 80 in Step 218, and transmits the synchronization message to the telematics terminal 10 in Step 219.

The telematics terminal 10 receives the synchronization message, detects the synchronization data or the authentication failure data from the synchronization message, and displays the detected data on a display device for notification.

In FIG. 2, the method for transmitting and synchronizing all the synchronization data stored in the synchronization data allocation storage region of the computer 110 to the telematics terminal is described. Hereinafter, a method for synchronizing only desired data by inputting the key word from a user of the telematics terminal 10 will be described with reference to FIG. 3.

Figure 3:
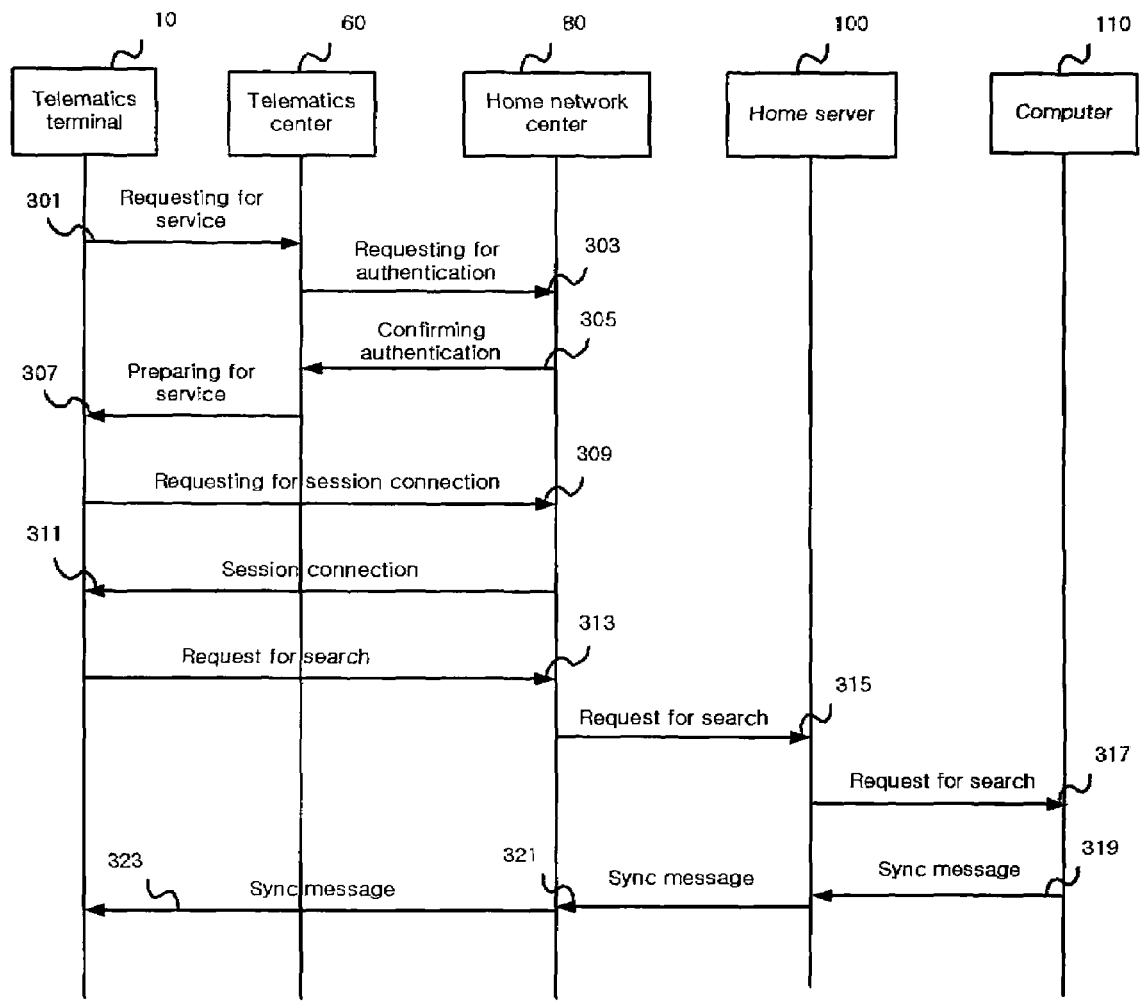
FIG. 3 is a process diagram illustrating a method of a synchronization service between a telematics terminal and a personal computer according to the second embodiment of the present invention.

FIG. 3 is a process diagram illustrating a method of a synchronization service between a telematics terminal and a personal computer according to the second embodiment of the present invention.

Even in FIG. 3, session connection is performed between the telematics terminal 10 and a home server 100-1 through the same Step 301 to 311 as the Steps 201 to 211 of FIG. 2.

If the session connection between the telematics terminal 10 and the home server 100-1 is performed, in Step 313, the telematics terminal 10 transmits a search request message having self identification information, third authentication information, key word and destination information, final terminal device (computer 110) information, and message kind information, to the home network center 80.

The home network center 80 receives the search request message, detects and analyzes the destination information of the search request message, and transmits the search request message to the home server 100-1 corresponding to the destination information in Step 315.

The home server 100-1 receives the search request message, detects and analyzes terminal device (computer 110) information from the search request message, and transmits the terminal device information to a corresponding terminal device, that is, to the computer 110.

The computer 110 receives the search request message, detects the third authentication information from the search request message, and performs authentication. Upon authentication success, the computer 110 detects the key word from the search request message, and searches stored synchronization data of the synchronization data allocation storage region for synchronization data having the key word. Upon authentication failure, the computer 110 transmits a synchronization message including authentication failure data to the home server 100-1 in Step 319. If the synchronization data having the key word is searched, in Step 319, the computer 110 generates and transmits the synchronization message to the home server 100-1 and, otherwise, transmits a synchronization message including search failure data to the home server 100-1.

The home server 100 receives the synchronization message, and transmits the received synchronization message to the home network center 80 in Step 321, and the home network center 80 transmits the synchronization message to the telematics terminal 10 in Step 323.

The telematics terminal 10 receives the synchronization message, detects the synchronization data, the authentication failure data, or the search failure data from the synchronization message, and displays the detected data on a liquid crystal display (LCD).

In FIGS. 2 and 3, a system operation is described. Hereinafter, constructions and operations of the telematics terminal 10 and the computer 110 will be described.

Figure 4:
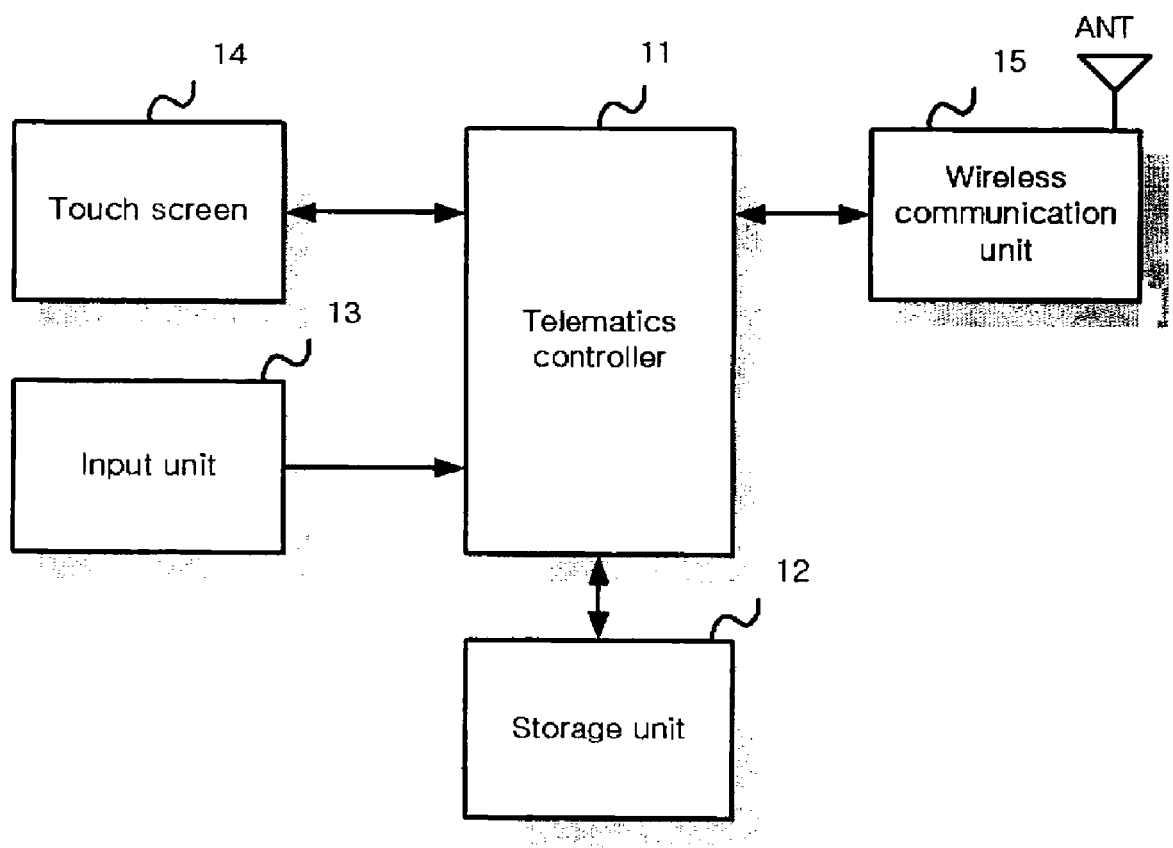
FIG. 4 schematically illustrates a construction of a telematics terminal according to the present invention.

FIG. 4 schematically illustrates the construction of the telematics terminal 10 according to the present invention.

Referring to FIG. 4, the inventive telematics terminal 10 includes a controller 11, a storage unit 12, an input unit 13, a touch screen 14, and a wireless communication unit 15.

The telematics controller 11 controls a general operation of the telematics terminal 10, including an operation of the synchronization service between the telematics terminal 10 and the personal computer 110 according to the present invention.

The storage unit 12 includes a region for storing a control program controlling the operation of the telematics terminal 10; a region for storing first authentication information for authentication when access is made to the telematics center 60, second authentication information for authentication when access is made to the home network center 80, and synchronization object information, that is, destination information, and a region for storing the synchronization data.

The input unit 13 can employ a key input unit as an input means interfaced with a user. In case where the input unit 13 employs the key input unit, it includes a plurality of keys such as a mode key, a search key, an end key, and a selection key, and generates and outputs key data on the keys to the telematics controller 11.

The touch screen 14 provides a user graphic interface means by integrating a display device such as the LCD and a touch pad, and displays an operation state and an image of the telematics terminal 10.

The wireless communication unit 15 performs the data communication with the telematics center 60 and the home network center 80 through the wireless network 50 of FIG. 1.

Figure 5:
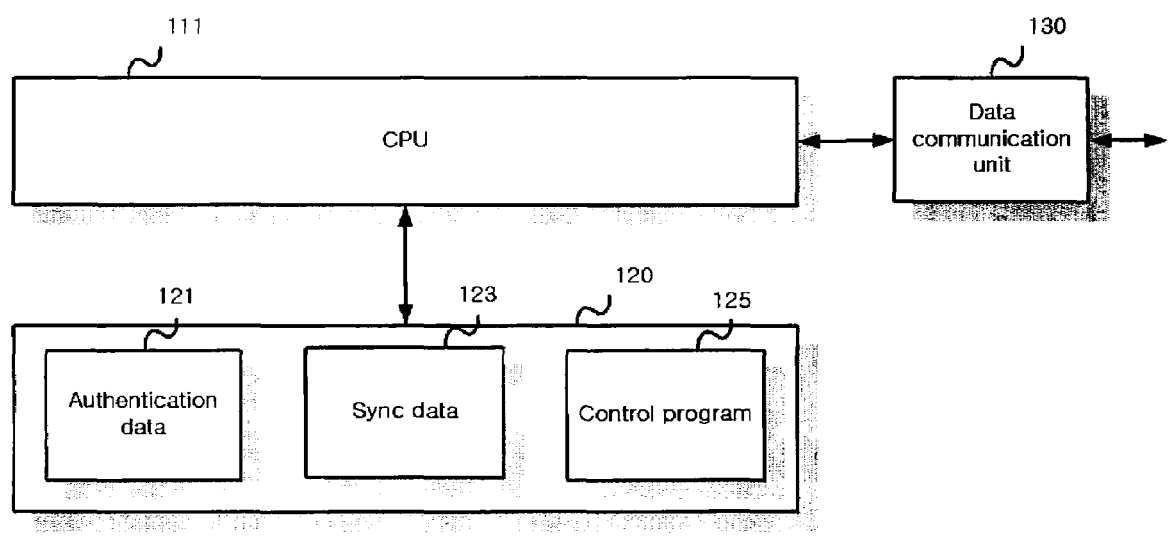
FIG. 5 schematically illustrates a construction of a computer according to the present invention.

FIG. 5 schematically illustrates a construction of the computer according to the present invention. Hereinafter, the construction of the computer 110 will be described with reference to FIG. 5.

The computer 110 includes a central processing unit (CPU) 111, a storage unit 120, and a data communication unit 130.

The CPU 111 controls a general operation of the computer 110 and particularly, controls an operation of the synchronization service between the telematics terminal 10 and the computer 110.

The storage unit 120 includes an authentication data storing region 121 for storing the authentication data for performing the authentication through comparison with the third authentication information received upon generation of the synchronization service request; a synchronization data storing region 123 for storing the synchronization data; and a control program storing region 125 for storing the control program.

The data communication unit 130 being a local area network (LAN) is connected with the Internet network 70 through the home server 100-1, the housing complex server 90, and the home network center 80, and performs the data communication.

Figure 6:
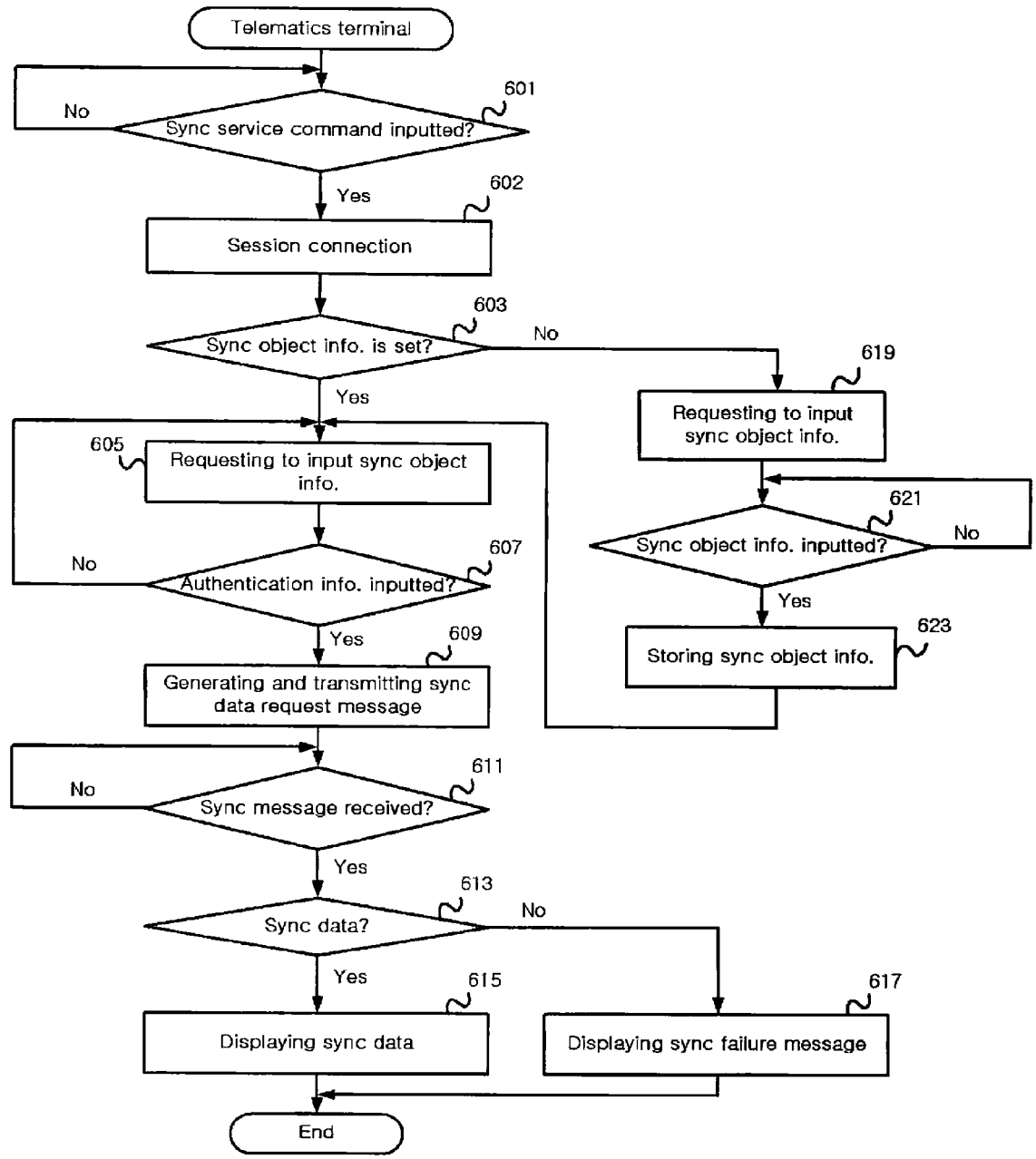
FIG. 6 is a flowchart illustrating an operation of a telematics terminal for a synchronization service between the telematics terminal and a computer according to the first embodiment of the present invention.

FIG. 6 is a flowchart illustrating an operation of the telematics terminal for the synchronization service between the telematics terminal and the computer according to the first embodiment of the present invention. Hereinafter, the operation of the telematics terminal will be described with reference to FIGS. 4 to 6.

In Step 601, a telematics controller 11 determines whether or not to receive key data or coordinate data (Hereinafter, referred to as "synchronization service command") for requesting the synchronization service, from the input unit 13 or the touch screen 14.

Upon receipt of the synchronization service command in the Step 601, in Step 602, the telematics controller 11 performs session connection as described above in FIG. 2.

Upon execution the session connection in the Step 602, in Step 603, the telematics controller 11 determines whether or not the synchronization object information is set to the storage unit 12. The synchronization object information is information on the terminal device capable of storing and synchronizing data.

If it is determined that the synchronization object information is not set in the Step 603, the telematics controller 11 proceeds with Step 619. If it is determined that the synchronization object information is set, the telematics controller 11 proceeds with Step 605.

In the Step 619, the telematics controller 11 displays a message of requesting to input the synchronization object information on the touch screen 14 and, in Step 621, determines whether or not to receive the synchronization object information.

Upon receipt of the synchronization object information in the Step 621, the telematics controller 11 stores the received synchronization object information in Step 623, and proceeds with Step 605.

In the Step 605, the telematics controller 11 displays a message of requesting to input synchronization object authentication information, that is, third authentication information on the touch screen 14 and, in Step 607, determines whether or not to receive the third authentication information depending on the displaying of the message.

Upon receipt of the third authentication information in the Step 607, in Step 609, the telematics controller 11 generates a synchronization data request message including the self identification information, the destination information for the home server 100-1, the third authentication information, and the message kind information, and transmits the synchronization data request message in the Step 213 of FIG. 2.

After the transmitting of the synchronization data request message, in Step 611, the telematics controller 11 determines whether or not to receive a synchronization message in response to the synchronization data request message.

Upon receipt of the synchronization message in the Step 611, in Step 613, the telematics controller 11 analyzes the synchronization message and determines whether the synchronization message is a message having synchronization data or a message having authentication failure data.

If it is determined as an analysis result that the synchronization message is the message having the synchronization data, in Step 615, the controller 11 displays the synchronization data on the touch screen 14. If the synchronization message is determined to be the authentication failure data, in Step 617, the controller 11 displays the synchronization failure data on the touch screen 14.

Figure 7:
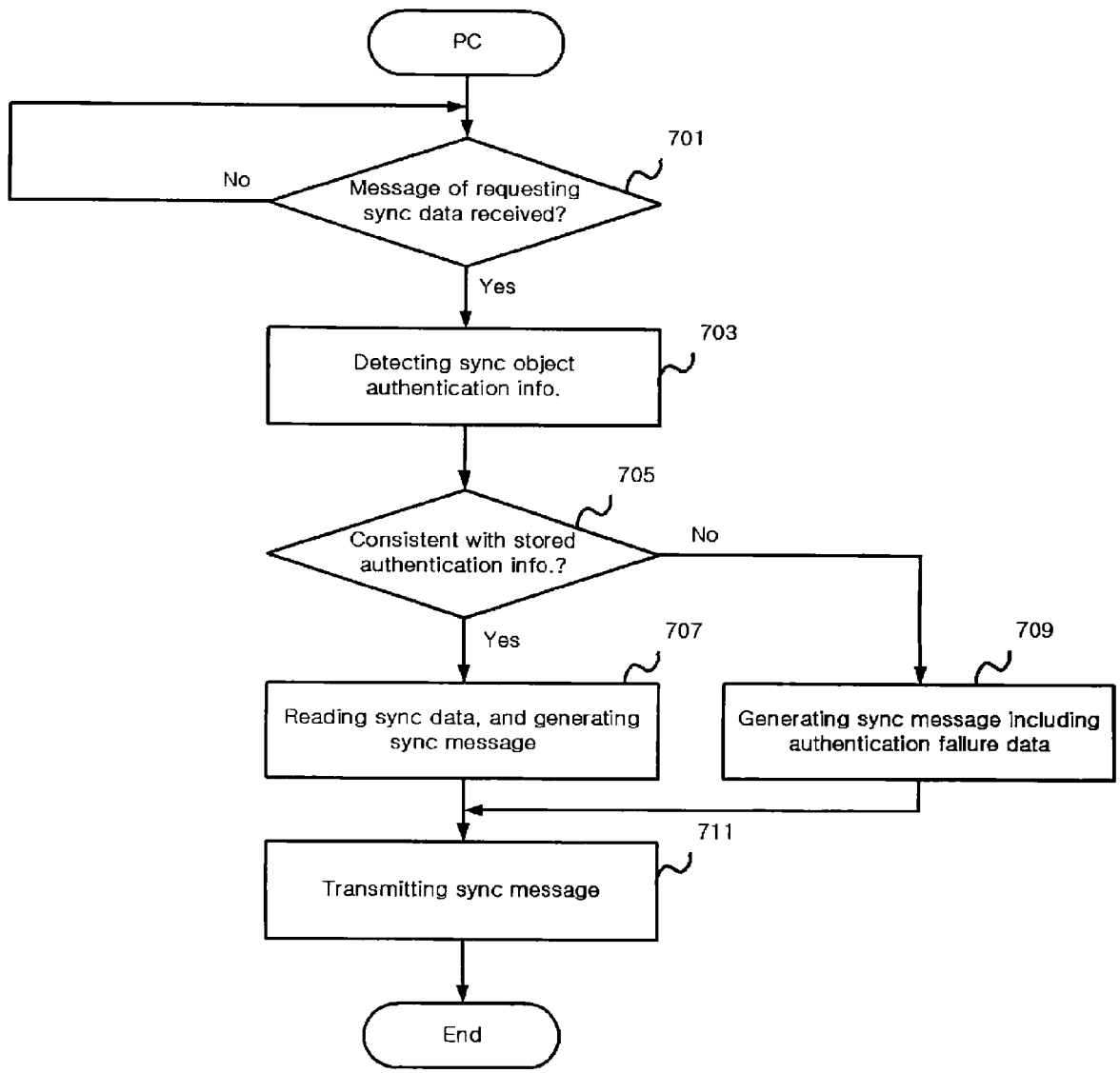
FIG. 7 is a flowchart illustrating an operation of a computer for a synchronization service between a telematics terminal and the computer according to the first embodiment of the present invention.

FIG. 7 is a flowchart illustrating an operation of a computer for a synchronization service between a telematics terminal and the computer according to the first embodiment of the present invention. Hereinafter, the operation of the computer will be described with reference to FIG. 7.

In Step 711, the CPU 111 determines whether or not to receive a synchronization data request message through a data communication unit 130.

Upon receipt of the synchronization data request message in the Step 701, in Step 703, the CPU 111 detects synchronization object authentication information, that is, third authentication information from the synchronization data request message and, in Step 705, determines whether or not the detected third authentication information is consistent with authentication information previously stored in an authentication data storing region 121, and performs authentication.

If it is determined that the detected authentication information is consistent with the previously stored authentication information in the Step 705, the CPU 111 determines to be authentication success, reads synchronization data from a previously set synchronization data storing region 123, generates a synchronization message, and transmits the generated synchronization message through a data communication unit 130.

On the contrary, if the authentication fails in the Step 705, in Step 709, the CPU 111 generates a synchronization message including authentication failure data and, in Step 711, transmits the generated synchronization message to the telematics terminal 10 through the data communication unit 130.

Figure 8:
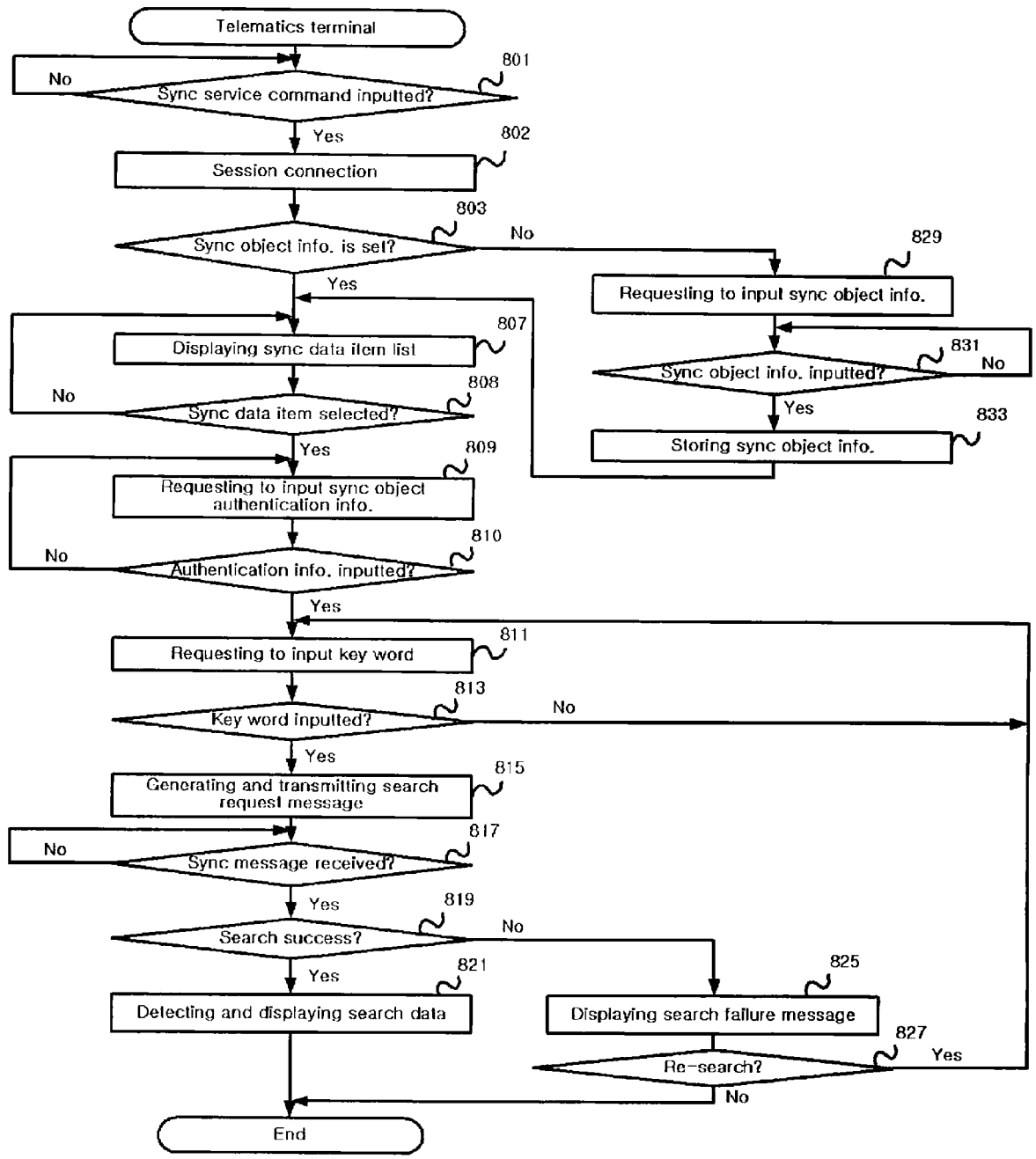
FIG. 8 is a flowchart illustrating an operation of a telematics terminal for a synchronization service between the telematics terminal and a computer according to the second embodiment of the present invention.

FIG. 8 is a flowchart illustrating an operation of a telematics terminal for a synchronization service between the telematics terminal and a computer according to the second embodiment of the present invention. Hereinafter, the operation of the telematics terminal 10 will be described with reference to FIG. 8.

In Step 801, a telematics controller 11 determines whether or not to receive a synchronization service command from an input unit 13 or a touch screen 14.

Upon receipt of the synchronization service command in the Step 801, in Step 802, the telematics controller 11 performs session connection as described above in FIG. 3.

92 Upon execution of the session connection in the Step 802, in Step 803, the telematics controller 11 determines whether or not synchronization object information is set to a storage unit 12. The synchronization object information is information on a terminal device capable of storing and synchronizing data.

If it is determined that the synchronization object information is not set in the Step 803, the telematics controller 11 proceeds with Step 829. If it is determined that the synchronization object information is set, the telematics controller 11 proceeds with Step 807.

In the Step 829, the telematics controller 11 displays a message of requesting to input the synchronization object information on a touch screen 14 and, in Step 831, determines whether or not to receive the synchronization object information.

Upon receipt of the synchronization object information in the Step 831, the telematics controller 11 stores the received synchronization object information in Step 833, and proceeds with Step 807.

In the Step 807, the telematics controller 11 displays a synchronization data item list on the touch screen 14. The synchronization data item list is previously set to be identical with that of the computer 110.

If the synchronization data item list is displayed, in Step 808, the telematics controller 11 determines whether or not a synchronization data item is selected.

If the synchronization data item is selected in the Step 808, in Step 809, the telematics controller 11 requests to input synchronization object authentication information (third authentication information) through the touch screen 14.

After the Step 809, in Step 810, the telematics controller 11 determines whether or not to receive the authentication information and, upon receipt of the authentication information in the Step 810, in Step 811, requests to input a key word through the touch screen 14.

After the Step 811, in Step 813, the telematics controller 11 determines whether or not to receive the key word and, upon receipt of the key word from a user, in Step 815, generates a search request message including self identification information, destination information, synchronization object information, authentication information, and message kind information, and transmits the generated request message through a wireless communication unit 15.

After the transmitting of the search request message, in Step 817, the telematics controller 11 determines whether or not to receive a synchronization message through the wireless communication unit 15.

Upon receipt of the synchronization message in the Step 817, the telematics controller 11 analyzes the synchronization message, and determines search success or failure. Upon the search success, in Step 821, the telematics controller 11 detects and displays search data on the touch screen 14.

On the contrary, upon the search failure, in Step 825, the telematics controller 11 displays a search failure message on the touch screen 14 and, in Step 827, displays a message of inquiring whether or not to perform re-search on the touch screen and then determines whether to select the re-search or an end.

Upon selection of the re-search in the Step 827, the telematics controller 11 returns to the Step 711 and repeatedly performs the Steps 711 and its subsequent steps. This can be repeatedly performed until the user finds his/her desiring synchronization data.

Figure 9:
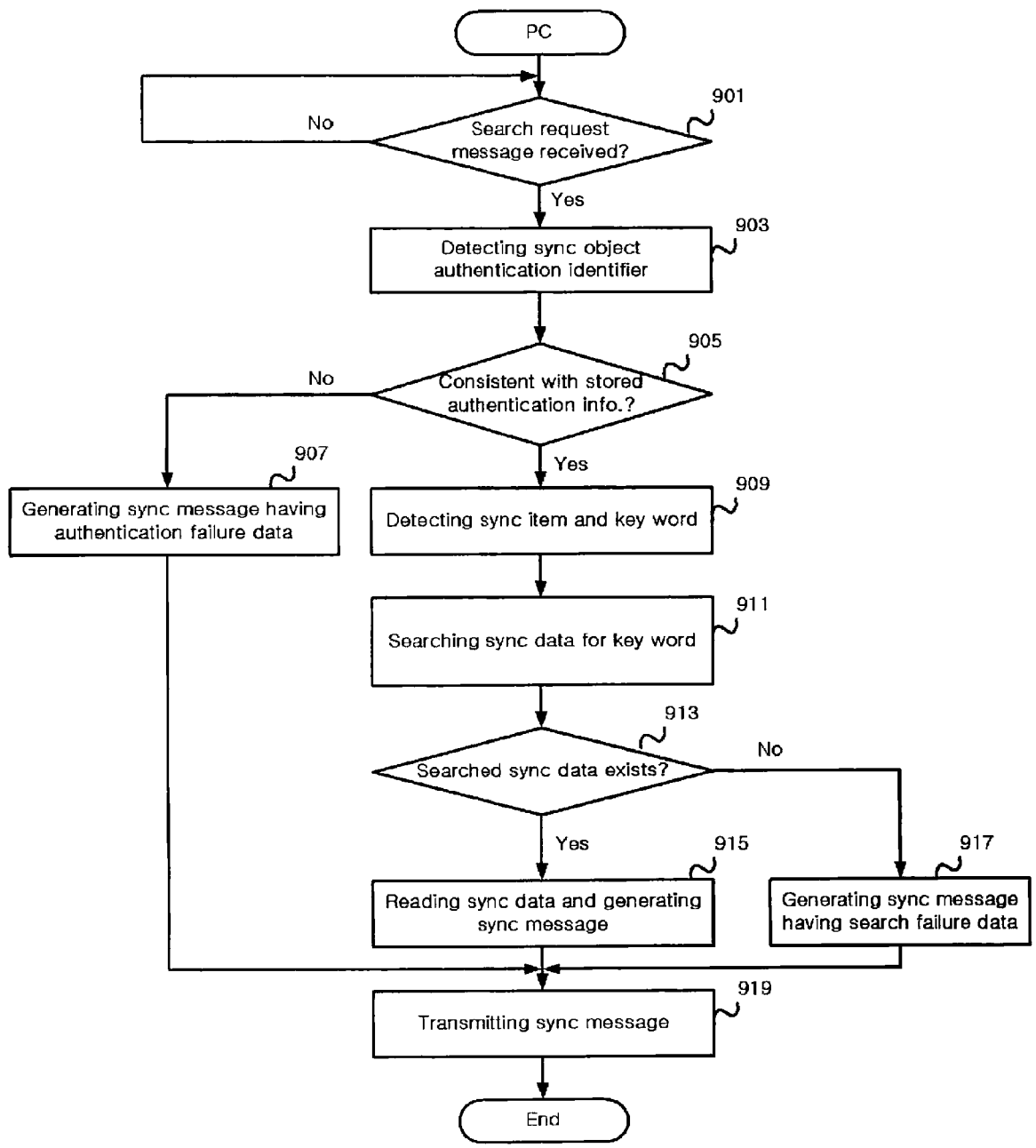
FIG. 9 is a flowchart illustrating an operation of a computer for a synchronization service between a telematics terminal and the computer according to the second embodiment of the present invention.

FIG. 9 is a flowchart illustrating an operation of a computer for a synchronization service between a telematics terminal and the computer according to the second embodiment of the present invention. Hereinafter, the operation of the computer 110 of FIG. 9 will be described.

In Step 901, the CPU 111 determines whether to receive a search request message through a data communication unit 130.

Upon receipt of the search request message in the Step 901, in Step 903, the CPU 111 detects synchronization object authentication information (third authentication information) from the search request message and, in Step 905, determines whether or not the detected third authentication information is compared and consistent with authentication information previously stored in an authentication data storing region 121, and performs authentication.

Upon authentication failure in the Step 905, in Step 907, the CPU 111 generates a synchronization message including authentication failure data and, in Step 919, transmits the generated synchronization message. On the contrary, upon authentication success, in Step 909, the CPU 111 detects a synchronization data item and a key word from the search request message and, in Step 911, searches the synchronization data corresponding to the synchronization data item for synchronization data having the key word from a synchronization data storing region 123.

After the search, in Step 913, the CPU 111 determines whether or not there is the searched synchronization data. If it is determined that there is the searched synchronization data, in Step 915, the CPU 111 reads the corresponding synchronization data from the synchronization data storing region 123, and generates a synchronization message including the read synchronization data and, in Step 919, transmits the generated synchronization message through the data communication unit 130.

On the contrary, if there is not the searched synchronization data in the Step 913, in Step 917, the CPU 111 generates a synchronization message including search failure data and, in Step 919, transmits the generated synchronization message.

In the above description, the data of the computer 110 is synchronized in the telematics terminal 10 but, on the contrary, the data of the telematics terminal 10 can be also synchronized in the computer 110.

As described above, the present invention has an advantage in that the telematics terminal installed in a vehicle can synchronize and share the data stored in the personal computer, thereby providing convenience to the user.

Further, the present invention has an advantage in that the telematics terminal can synchronize the data of the computer, thereby enhancing a data utility.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A home telematics system providing a synchronization service between a telematics terminal and a computer, the system comprising:
    a telematics system having a telematics center;
    a home network system having a home network center and a home server;
    the telematics terminal for, upon generation of a synchronization service request, connecting with the home network center through the telematics center, transmitting a synchronization data request message to the home network center, and displaying synchronization data received in response to the synchronization data request message; and
    the computer for receiving the synchronization data request message through the home network center and the home server, and transmitting the synchronization data stored in a previously allocated storing region to the telematics terminal through the home server and the home network center,
    wherein the synchronization data request message comprises computer authentication information,
    wherein the computer compares the computer authentication information of the synchronization data request message with previously stored authentication information, performs authentication and, upon authentication success, transmitting the previously stored synchronization data to the telematics terminal, and
    wherein, upon authentication failure, the computer transmits a message of informing the authentication failure to the telematics terminal.

2. A home telematics system providing a synchronization service between a telematics terminal and a computer, the system comprising:
    a telematics system having a telematics center;
    a home network system having a home network center and a home server;
    the telematics terminal for, upon generation of a synchronization service request, connecting with the home network center through the telematics center, transmitting a search request message having a synchronization item and a key word to the home network center, and displaying synchronization data received in response to the search request message; and
    the computer for receiving the search request message through the home network center and the home server, detecting the synchronization item and the key word from the search request message, searching a previously allocated synchronization item storing region for the synchronization data having the key word, and transmitting the synchronization data to the telematics terminal through the home server and the home network centers,
    wherein the search request message comprises computer authentication information,
    wherein the computer compares the computer authentication information of the search request message with previously stored authentication information, performs authentication and, upon authentication success, transmitting the previously stored synchronization data to the telematics terminal, and
    wherein, upon authentication failure, the computer transmits a message of informing the authentication failure to the telematics terminal.

3. A method of a synchronization service between a telematics terminal and a computer in a home telematics system having a telematics system and a home network system, the telematics system having the telematics terminal and a telematics center, and the home network system having a home network center and a home server, the method comprising the steps of:
    in the telematics terminal, upon generation of a synchronization service request, connecting with the home network center through the telematics center, transmitting a synchronization data request message to the home network center;
    in the computer, receiving the synchronization data request message through the home network center and the home server, and transmitting the synchronization data stored in a previously allocated storing region to the telematics terminal through the home server and the home network center; and
    in the telematics terminal, receiving and displaying the synchronization data,
    wherein the synchronization data request message comprises computer authentication information,
    wherein the computer compares the computer authentication information of the synchronization data request message with previously stored authentication information, performs authentication and, upon authentication success, transmitting the previously stored synchronization data to the telematics terminal, and
    wherein, upon authentication failure, the computer transmits a message of informing the authentication failure to the telematics terminal.

4. A method of a synchronization service between a telematics terminal and a computer in a home telematics system having a telematics system and a home network system, the telematics system having the telematics terminal and a telematics center, and the home network system having a home network center and a home server, the method comprising the steps of:
    in the telematics terminal, upon generation of a synchronization service request, connecting with the home network center through the telematics center, and transmitting a search request message having a synchronization item and a key word to the home network center; in the computer, receiving the search request message through the home network center and the home server, detecting the synchronization item and the key word from the search request message, searching a previously allocated synchronization item storing region for the synchronization data having the key word, and transmitting the synchronization data to the telematics terminal through the home server and the home network center; and in the telematics terminal, receiving and displaying the synchronization data, wherein the search request message comprises computer authentication information, wherein the computer compares the computer authentication information of the search request message with previously stored authentication information, performs authentication and, upon authentication success, transmitting the previously stored synchronization data to the telematics terminal, wherein, upon authentication failure, the computer transmits a message of informing the authentication failure to the telematics terminal, wherein, upon search failure, the computer transmits a message of informing the search failure to the telematics terminal.

* * * * *